Patented June 28, 1949

2,474,603

UNITED STATES PATENT OFFICE 2,474,603

INHIBITION OF CORROSION IN WELLS

Prentiss S. Viles and Elza Q. Camp, Goose Creek, Tex., assignors, by mesne assignments, to Standard Oil Development Company, Elizabeth, N. J., a corporation of Delaware No Drawing. Application December 20, 1946, Serial No. 717,614

8 Claims. (Cl. 252—8.55)

The present invention is directed to the production of fluids from underground formations. More particularly, the invention is directed to protecting the conduits and attendant equipment, through which fluids from subsurface formations are flowed and processed, from corrosion by materials occurring in or are introduced into fluids originating in subsurface formations.

This application is a continuation-in-part of our copending application U. S. Serial No. 643,206, filed January 24, 1946, now Patent No. 2,453,881 dated November 16, 1948.

In many oil, gas, and condensate fields, the production of fluids from subsurface formations is accompanied by extremely severe corrosion of the conduits and attendant equipment which comes into contact with the fluid mixture being produced. In many cases it is found that the fluid mixture is acidic in nature and comprises substantial amounts of carbon dioxide, a portion of which dissolves in water present to form carbonic acid. In addition to the carbon dioxide other materials which are present in the corrosive mixture may include organic acids, inorganic acids, inorganic salts and acidic sulfur compounds. These corrosive substances occur in or are introduced into the fluids originating in the subsurface formations. In some cases the corrosion occurs throughout the conduits and attendant equipment through which the fluids from the subsurface formations are flowed and processed. In other cases the corrosion is limited primarily to portions of the conduits near the surface of the wells and to the wellhead and attendant equipment. In all cases it has been necessary to make extensive replacements of equipment that has failed as a result of corrosion. This not only limits production, but is extremely expensive, particularly in those cases in which it is necessary to kill a high pressure well in order to make repairs and to replace corroded equipment. In addition to the high costs of making repairs to well equipment, there is a marked loss in revenues due to having a well off production and to the necessity of having to maintain additional wells and sources of supply to meet production requirements during periods in which a well is off production for repairs as a result of corrosion. Further, there is constant danger that a well will flow wild as a result of the failure of equipment due to corrosion. In cases of this kind, enormous losses are incurred.

It is, therefore, the main object of the present invention to provide a method whereby corrosion is substantially eliminated or inhibited in the conduits and attendant equipment through which fluids from subsurface formations are flowed and processed.

In accordance with the present invention, corrosion of ferrous metal surfaces is inhibited or substantially eliminated by adding to fluid mixtures produced from sub surface formations and which are acidic in nature and include carbon dioxide a corrosion inhibiting amount of a mixture of a butyl mercaptan in a fluid vehicle. Small amounts of other sulfur-containing compound having the formula XSY where X is selected from the group consisting of hydrogen, ammonium radical, organic radicals and monovalent Group I alkali metals and Y is selected from the group consisting of ammonium radical, organic radicals and monovalent Group I alkali metals are also useful in suppressing corrosion of ferrous metals in contact with fluids produced from subsurface formations. Specific examples of such compounds which may be mentioned are $NH_4HS$ and $(NH_4)_2S$ and compounds having the formula $R_2S_2$, MHS and $M_2S$ where R is a monovalent organic radical, such as an alkyl, aryl, or a benzyl grouping, and M is a monovalent metal selected from the Group I alkali metals.

The amount of sulfur-containing compound employed to inhibit the corrosion of the ferrous metallic surfaces by the fluid mixtures may be varied over a wide range and satisfactory results obtained. Inasmuch as sulfur-containing compounds are usually undesirable constituents in the hydrocarbon fluid being obtained, it is preferable to employ only small amounts of one of the sulfur-containing compounds to inhibit the corrosion but in some cases relatively large amounts of the sulfur-containing compounds may be desirable or necessary and in such instances the sulfur-containing compound may be added in amounts up to 3% by weight based on the weight of fluid mixture produced from the subsurface formation. However, it will usually be found that minor amounts of one of the sulfur-containing compounds will be effective for inhibiting corrosion of the ferrous metal surfaces and, accordingly, under many operating conditions the sulfur compound used for effectively inhibiting corrosion may be .1% or even as low as .01% by weight of the fluid mixture being produced.

It may be found that after an effective amount of the sulfur-containing compound has been employed to inhibit corrosion of the ferrous metal surface, a lower amount may be effective thereafter to maintain the inhibiting effect. Accordingly, a substantial amount of sulfur-containing compound, as of the order of 1% by weight of the fluid produced, may be employed for an interval of time sufficient to cause corrosion of the metallic surfaces to be effectively inhibited and thereafter smaller amounts, as of the order of .01% of sulfur-containing compounds based on the weight of the fluid produced, may be employed to maintain the inhibited condition of the metallic surfaces.

It will be found convenient to suspend or dissolve the sulfur-containing compound in a suitable vehicle before introducing it into the fluid mixture. The resultant suspension or solution may then be conveniently injected into the borehole adjacent the subsurface formation from which the fluid is produced or may be introduced into the conduit through which the fluid mixture flows from a subsurface formation to the surface of the earth. Another method of employing the inhibiting agent is by injecting the suspension or solution into the subsurface reservoir by employing an adjacent well; it will be apparent that when adding the inhibiting agent in accordance with this procedure the fluid entering the borehole of the producing well will comprise the inhibiting agent.

An advantage of the process of the present invention, irrespective of the suppression of corrosion of the conduits and attendant equipment through which fluids from subsurface formations are flowed and processed, is the ability to operate without interruptions due to failure of equipment. The danger of a well flowing wild is minimized and the necessity of having a surplus of wells to insure production is eliminated.

In order to illustrate further the beneficial effects of the present invention, the following examples are given:

EXAMPLE I

Test pieces of carbon steel were immersed in water solutions under a pressure of 100 lbs. per sq. in. gauge of carbon dioxide and the test pieces were maintained under this pressure for an interval of 24 hours and at a temperature of 170° F. The carbon dioxide was admitted to the system through a pressure regulator valve thus maintaining a constant pressure of carbon dioxide on the system so that the water solutions in which the carbon steel test specimens were immersed were saturated with carbon dioxide at the temperatures and pressure at which the tests were conducted. One of the solutions was employed as a blank with no inhibiting material added while other solutions had added thereto inhibiting material comprising carbon disulfide, butyl mercaptan, sodium sulfide and ammonium sulfide, respectively. The results obtained by the test are shown in Table I.

*Table I*

| Inhibiting Material | Amount of Inhibiting Material | Corrosion Rate | Reduction of Corrosion by Inhibition |
|---|---|---|---|
| | Per cent by weight | Inches per year | Per cent |
| None | None | 0.2250 | |
| Carbon Disulfide | 1.0 | 0.0269 | 88.1 |
| Butyl Mercaptan | 1.0 | 0.0084 | 96.4 |
| Ammonium Hydrosulfide | 1.0 | 0.0087 | 82.1 |
| Na$_2$S.9H$_2$O | 1.0 | 0.0163 | 92.8 |

In order to determine the effectiveness of altering the pressure on the inhibiting agent, a series of tests was conducted as follows:

EXAMPLE II

A quantity of distilled water was divided into a plurality of samples. Some of the samples were maintained as distilled water; to other of the samples acetic acid was added to obtain a pH of 4.5; to other samples of distilled water hydrochloric acid was added to obtain a pH of 4.5; in other samples a low concentration of sodium chloride was dissolved, while to still other samples a high concentration of sodium chloride was dissolved. Some of the samples were then inhibited by adding CS$_2$ thereto. Test pieces of carbon steel were immersed in the solutions prepared. One set of samples was then maintained under the pressure of 100 lbs. per sq. in. gauge of carbon dioxide, a second set of samples was maintained under a pressure of 500 lbs. per sq. in. gauge of carbon dioxide while a third set of the samples was maintained under a pressure of 900 lbs. per sq. in. gauge of carbon dioxide. In conducting the tests the sets of samples were maintained under a superatmospheric pressure for an interval of 24 hours and at a temperature of 170° F. The results obtained when conducting the tests under a pressure of 100 lbs. per sq. in. are set forth in Table II below. The results obtained when conducting the tests under a pressure of 500 lbs. per sq. in. are shown in Table III below, while the results obtained when conducting the tests under a pressure of 900 lbs. per sq. in. are shown in Table IV below.

*Table II*

| | Corrosion Rate, Inch Per Year | | Reduction in Corrosion Rate, Per Cent |
|---|---|---|---|
| | Without Inhibitor | Inhibited with 1 Weight Per Cent of CS$_2$ | |
| Type of Solution: | | | |
| Distilled Water | 0.2250 | 0.0269 | 88.0 |
| Distilled Water Adjusted to pH 4.5 with Acetic Acid | 0.1869 | 0.0175 | 90.7 |
| Distilled water Adjusted to pH 4.5 with Hydrochloric Acid | 0.0555 | 0.0166 | 71.0 |
| Water of low salt content | 0.1189 | 0.0209 | 82.0 |
| Water of high salt content | 0.1098 | 0.0197 | 82.0 |

*Table III*

| | Corrosion Rate, Inch Per Year | | Reduction in Corrosion Rate, Per Cent |
|---|---|---|---|
| | Without Inhibitor | Inhibited with 1 Weight Per Cent of CS$_2$ | |
| Type of Solution: | | | |
| Distilled Water | 0.2083 | 0.0278 | 86.8 |
| Distilled Water Adjusted to pH 4.5 with Acetic Acid | 0.1070 | 0.0164 | 86.6 |
| Distilled Water Adjusted to pH 4.5 with Hydrochloric Acid | | 0.0343 | |
| Water of low salt content | 0.1073 | 0.0189 | 82.0 |
| Water of high salt content | | 0.0447 | |

*Table IV*

| | Corrosion Rate, Inch Per Year | | Reduction in Corrosion Rate, Per Cent |
|---|---|---|---|
| | Without Inhibitor | Inhibited with 1 Weight Per Cent of CS$_2$ | |
| Type of Solution: | | | |
| Distilled Water | 0.2100 | 0.0219 | 89.5 |
| Distilled Water Adjusted to pH 4.5 with Acetic Acid | 0.1060 | 0.0401 | 62.3 |
| Distilled Water adjusted to pH 4.5 with Hydrochloric acid | | 0.0310 | |
| Water of low salt content | 0.1307 | 0.0179 | 86.3 |
| Water of High Salt Content | | 0.0182 | |

EXAMPLE III

Additional sulfur compounds were then tested for the inhibition of the corrosivity of carbon steel to a saturated carbon dioxide solution under conditions identical to those described in Example I.

The compounds employed as inhibitors, the amount of inhibiting material employed, and the results obtained at the end of the test are presented in the following table:

Table V

| Inhibiting Material | Amount of Inhibiting Material, Per Cent by Weight | Corrosion Rate, In. Per Year | Reduction of Corrosion by Inhibition, Per Cent |
| --- | --- | --- | --- |
| None | None | 0.2250 | ---- |
| Sodium Hydrosulfide | 1.0 | 0.0335 | 85.0 |
| Potassium Hydrosulfide | 1.0 | 0.0081 | 96.7 |
| Lithium Sulfide | 1.0 | 0.0167 | 92.5 |
| Propyl Mercaptan | 1.0 | 0.0253 | 88.7 |
| Benzyl Mercaptan | 1.0 | 0.0173 | 92.3 |
| Tertiary Hexyl Mercaptan | 1.0 | 0.0466 | 79.3 |
| Phenyl Mercaptan | 1.0 | 0.0569 | 74.8 |
| Diethyl sulfide | 1.0 | 0.0094 | 95.8 |
| Ethyl sulfide | 1.0 | 0.0261 | 88.3 |
| N-butyl disulfide | 1.0 | 0.0183 | 92.0 |
| Benzyl disulfide | 1.0 | 0.0307 | 86.4 |
| Phenyl sulfide | 1.0 | 0.0327 | 85.4 |
| Ammonium Sulfide | 1.0 | 0.0052 | 97.7 |
| Thiophene | 1.0 | 0.0485 | 79.5 |
| Thiourea | 1.0 | 0.0251 | 89.0 |
| Dioctyl thioether | 1.0 | 0.0902 | 59.8 |
| Didodecyl thioether | 1.0 | 0.1079 | 52.0 |

It will be observed from the data presented in the foregoing examples that addition of small amounts of a sulfur compound of the types illustrated effects marked reduction in the tendency of corrosive water solutions to corrode carbon steel. It is noted that all sulfur-containing compounds are not effective for inhibiting corrosion of ferrous metallic surfaces when exposed to corrosive fluids such as are produced in subsurface formations. For example, ethyl sulfate increased the corrosion rate from 0.2250 inch per year to 0.497 inch per year and thioglycolic acid increased the corrosion rate from the aforesaid low figure to 0.719 inch per year.

Under the provisions of Rule 43 of The Rules of Practice in the United States Patent Office, reference is made to co-pending application U. S. Serial No. 626,447, filed November 2, 1945, for E. Q. Camp, and entitled "Prevention of corrosion" and U. S. Patent 2,453,881, issued November 16, 1948, to P. S. Viles and E. Q. Camp entitled "Inhibition of corrosion in wells" pertaining to subject matter common to the disclosures of the present application but not claimed herein.

The nature and objects of the present invention having been fully described and illustrated, what we wish to claim as new and useful and to secure by Letters Patent is:

1. In the production of corrosive fluid having an acid reaction including carbon dioxide from a subsurface formation wherein the fluid being produced is brought into contact with ferrous metal, the step of introducing a corrosion inhibiting amount of butyl mercaptan into the corrosive liquid.

2. A method in accordance with claim 1 in which the butyl mercaptan is added to the corrosive fluid in an amount no greater than 1% by weight.

3. A method in accordance with claim 1 in which the butyl mercaptan is introduced into the corrosive fluid in the subsurface formation at a point remote from the point from which the fluid is produced.

4. A method in accordance with claim 1 in which the corrosive fluid is produced from the subsurface formation through a ferrous metal conduit and in which the butyl mercaptan is introduced directly into said conduit.

5. A method for producing a corrosive fluid having an acid reaction and including carbon dioxide from a subsurface formation wherein the fluid being produced is brought into contact with ferrous metal which includes the steps of forming a mixture of butyl mercaptan, with a fluid vehicle, introducing a corrosion inhibiting amount of said mixture into the corrosive fluid in contact with the ferrous metal conduit and flowing said corrosive fluid in contact with said mixture through said conduit.

6. A method in accordance with claim 5 in which the fluid vehicle is a liquid.

7. A method in accordance with claim 5 in which the fluid vehicle is a gasiform fluid.

8. A method in accordance with claim 5 in which the fluid vehicle is a hydrocarbon.

PRENTISS S. VILES.
ELZA Q. CAMP.

REFERENCES CITED

The following references are of record in the file of this patent:

UNITED STATES PATENTS

| Number | Name | Date |
| --- | --- | --- |
| 1,829,705 | Walker | Oct. 27, 1931 |
| 2,357,559 | Smith | Sept. 5, 1944 |

OTHER REFERENCES

Condensate Field Corrosion, article in The Oil Weekly, May 6, 1946, page 32.